(12) United States Patent
Ohnogi et al.

(10) Patent No.: US 8,690,172 B2
(45) Date of Patent: Apr. 8, 2014

(54) AXLE HOUSING ASSEMBLY FOR WORK VEHICLE

(75) Inventors: Hiroaki Ohnogi, Komatsu (JP); Fumiaki Nakada, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/808,740

(22) PCT Filed: May 8, 2012

(86) PCT No.: PCT/JP2012/061728
§ 371 (c)(1),
(2), (4) Date: Jan. 7, 2013

(87) PCT Pub. No.: WO2013/108420
PCT Pub. Date: Jul. 25, 2013

(65) Prior Publication Data
US 2013/0181505 A1    Jul. 18, 2013

(30) Foreign Application Priority Data
Jan. 18, 2012  (JP) ................................ 2012-008021

(51) Int. Cl.
*B60B 35/16* (2006.01)
(52) U.S. Cl.
USPC ......... 280/93.512; 301/132; 301/137; 74/607
(58) Field of Classification Search
USPC ................ 280/93.512; 301/132, 137; 74/607
See application file for complete search history.

(56) References Cited

U.S. PATENT DOCUMENTS

| | | | | |
|---|---|---|---|---|
| 1,978,685 A | * | 10/1934 | Mogford et al. | 228/144 |
| 4,337,953 A | * | 7/1982 | Ikeda et al. | 277/503 |
| 4,807,939 A | * | 2/1989 | Sasa | 301/137 |
| 5,281,005 A | * | 1/1994 | Babcock et al. | 301/132 |
| 5,655,418 A | * | 8/1997 | Barnholt | 74/607 |
| 6,189,410 B1 | * | 2/2001 | Inoue | 74/606 R |
| 6,986,406 B1 | * | 1/2006 | Hauser et al. | 184/6.28 |
| 7,108,428 B2 | * | 9/2006 | Ason et al. | 384/583 |
| 7,699,405 B2 | * | 4/2010 | Gradu et al. | 301/105.1 |
| 2007/0222280 A1 | * | 9/2007 | Abend et al. | 301/137 |
| 2007/0245798 A1 | * | 10/2007 | Yang | 72/367.1 |

FOREIGN PATENT DOCUMENTS

| | | |
|---|---|---|
| JP | 54-130227 U | 9/1979 |
| JP | 55-75515 U | 5/1980 |
| JP | 55-179255 U | 12/1980 |
| JP | 59-128945 U | 8/1984 |

(Continued)

*Primary Examiner* — Joseph M Rocca
*Assistant Examiner* — Timothy Wilhelm
(74) *Attorney, Agent, or Firm* — Global IP Counselors, LLP

(57) ABSTRACT

An axle housing assembly for a work vehicle is adapted to be mounted in the work vehicle, and includes an axle housing and a disc-shaped member. The axle housing has a recessed portion for press fitting on an end thereof. The recessed portion is opened to a vehicle outer side, the recessed portion having a constant inner diameter. The disc-shaped member is press-fitted into the recessed portion, an outer peripheral surface of the disc-shaped member having a single reference dimension. A first region of the outer peripheral surface is arranged on an inner side in a press fitting direction and processed at a first tight fit tolerance range with respect to the reference dimension. A second region of the outer peripheral surface is arranged outwards of the first region and processed at a second tight fit tolerance range less than the first tight fit tolerance range.

8 Claims, 3 Drawing Sheets

(56) References Cited

FOREIGN PATENT DOCUMENTS

| JP | 2005-972 A | 1/2005 |
|----|------------|--------|
| JP | 2006-258167 A | 9/2006 |
| JP | 2007-120558 A | 5/2007 |
| JP | 2007-237957 A | 9/2007 |
| JP | 2007-314114 A | 12/2007 |
| JP | 2008-240822 A | 10/2008 |

* cited by examiner

AXLE HOUSING ASSEMBLY FOR WORK VEHICLE

CROSS-REFERENCE TO RELATED APPLICATIONS

This application claims priority to Japanese Patent Application No. 2012-008021 filed on Jan. 18, 2012, the disclosure of which is hereby incorporated herein by reference in its entirety.

TECHNICAL FIELD

The present invention relates to an axle housing assembly to be used for a work vehicle.

BACKGROUND ART

As described in Japan Laid-open Patent Application Publication No. JP-A-2008-240822, Japan Laid-open Patent Application Publication No. JP-A-2007-237957 and etc., work vehicles such as backhoe loaders are provided with an axle housing. A differential gear mechanism is disposed in the center part within the axle housing, while axles are extended right and left from the differential gear mechanism. Further, components are disposed between the axles and the inner wall of the axle housing, including bearings for supporting the axles in a rotatable state and oil seals for sealing lubricating oil residing inside the axle housing.

Further, Japan Laid-open Patent Application Publication No. JP-A-2006-258167 describes an axle housing in a crawler-type travelling unit of a work vehicle. In the axle housing described in Japan Laid-open Patent Application Publication No. JP-A-2006-258167, axles are also disposed inside the housing while penetrating therethrough. Further, bearings are disposed on end portions of the axle housing in order to support the axles, while oil seals are disposed further outwards of the bearings in order to seal lubricating oil residing inside the axle housing.

SUMMARY

Here, each of the axles for driving steered wheels is provided with a joint at the tip thereof, while a wheel side member is coupled thereto through the joint. Further, the axle housing, including the axles therein, has joint accommodating portions on the ends thereof for accommodating the joints therein. Further, a member forming a steering mechanism is attached to axle housing openings forming the joint accommodating portions.

As described above, especially in the axle housing that the axles for driving the steered wheels are inserted therethrough, each end thereof is opened to the wheel side. Therefore, foreign substances (earth, sand, dust, etc.) easily enter the axle housing from the outside and reach the oil seals disposed on the ends of the axle housing. When foreign substances directly enter and reach the oil seals, the oil seals are easily damaged or broken. Therefore, in Japan Laid-open Patent Application Publication No. JP-A-2006-258167, cover members are fixed to the openings of the axle housing.

However, when such cover members are provided, the number of components is increased and the weight of the axle housing is also increased. Therefore, this results in cost increase.

In view of the above, it can be assumed to dispose simply structured protective plates on the opening ends of the axle housing in order to prevent foreign substances from directly entering the axle housing and reaching the oil seals. When such protective plates are disposed, it is required to prevent the protective plates from coming off from the axle housing to the outside. To achieve this, a structure can be assumed that annular grooves are formed on the inner wall of the axle housing and snap rings are attached thereto while being disposed outwards (on the coming-off side) of the protective plates.

However, the axle housing for a work vehicle is a large casting, and therefore, it is quite difficult to process annular grooves on such axle housing for allowing the snap rings to be attached thereto.

Such drawback could be produced not only in fixing the plates for protecting the oil seals but also similarly in fixing plates for protecting or retaining bearings to the axle housing. It is an object of the present invention to implement a simple structure in attaching a disc-shaped member to an axle housing and facilitate processing of the axle housing for preventing the disc-shaped member from coming off therefrom.

An axle housing assembly for a work vehicle according to a first aspect includes an axle housing and a disc-shaped member. The axle housing has a recessed portion for press fitting, opened to a vehicle outer side, on an end thereof and the recessed portion has a constant inner diameter. The disc-shaped member is press-fitted into the recessed portion and an outer peripheral surface thereof has a single reference dimension. Further, in the disc-shaped member, a first region of the outer peripheral surface, arranged on an inner side in a press fitting direction, is processed at a first tight fit tolerance range with respect to the reference dimension, whereas a second region of the outer peripheral surface, arranged outwards of the first region, is processed at a second tight fit tolerance range less than the first tight fit tolerance range.

Here, the outer peripheral surface of the disc-shaped member has the single reference dimension and is processed in a stepped shape with tolerance ranges. In other words, while the disc-shaped member is attached to the axle housing, the first region of the outer peripheral surface of the disc-shaped member, arranged on an inner side, is processed with the first tight fit tolerance range, whereas the second region, arranged outwards of the first region, is processed with the smaller second tight fit tolerance range.

When such disc-shaped member is press-fitted into the recessed portion of the axle housing, the inner side of the recessed portion is elastically deformed along the shape of the first region of the disc-shaped member. On the other hand, the outer side (opened side) of the recessed portion is once elastically deformed while being outwardly expanded by the press fitting of the first region. However, after passage of the first region, the outer side of the recessed portion is restored from its deformation along the dimension of the second region and is restored closer to the original dimension thereof. As a result, while the disc-shaped member is press-fitted into the recessed portion, the diameter of the recessed portion is smaller on the outer side than on the inner side. Therefore, the disc-shaped member is prevented from easily outwardly coming off.

In such structure, the recessed portion of the axle housing is only required to be processed at a constant inner diameter and does not require groove processing or etc. Therefore, a structure for fixing the disc-shaped member can be simplified and processing of the axle housing can be facilitated for preventing the disc-shaped member from coming off.

An axle housing assembly for a work vehicle according to a second aspect relates to the axle housing assembly of the first aspect, and wherein the axle housing has an inner recessed portion that is formed on a vehicle inner side of the recessed portion and has an inner diameter less than that of the recessed portion, and the disc-shaped member has a through hole in a center part thereof. Further, the axle housing assembly further includes a seal member attached to the inner recessed portion. Yet further, a rotary shaft is disposed while penetrating the through hole of the disc-shaped member and an inner peripheral part of the seal member.

Here, the disc-shaped member can block intrusion of foreign substances from the outside to the seal member and life time prolongation can be achieved for the seal member.

An axle housing assembly for a work vehicle according to a third aspect relates to the axle housing assembly of the first or second aspect, and wherein the disc-shaped member has a third region that is arranged outwards of the second region and is processed at a third tight fit tolerance range less than the second tight fit tolerance range.

Here, the number of stepped portions is further increased, and the disc-shaped member is thereby further prevented from easily coming off to the outside.

An axle housing assembly for a work vehicle according to a fourth aspect relates to the axle housing assembly of any of the first to third aspects, and wherein the axle housing has a joint accommodating part formed on an end thereof to accommodate therein a joint for coupling to a wheel-side member.

When the axle housing has the joint accommodating part formed on an end thereof, the end of the axle housing is required to be largely opened. Therefore, foreign substances can be effectively prevented from entering the inside of the axle housing by applying the present invention to such axle housing.

According to the present invention as described above, it is possible to implement a simple structure in attaching a disc-shaped member to an axle housing and facilitate processing of the axle housing for preventing the disc-shaped member from coming off therefrom. Further, with a second region formed outwards of a first region, a tight fit region can be reliably produced outwards of the first region and the disc-shaped member can be reliably prevented from coming off.

DESCRIPTION OF THE EMBODIMENTS

Overall Structure

Figure 1:
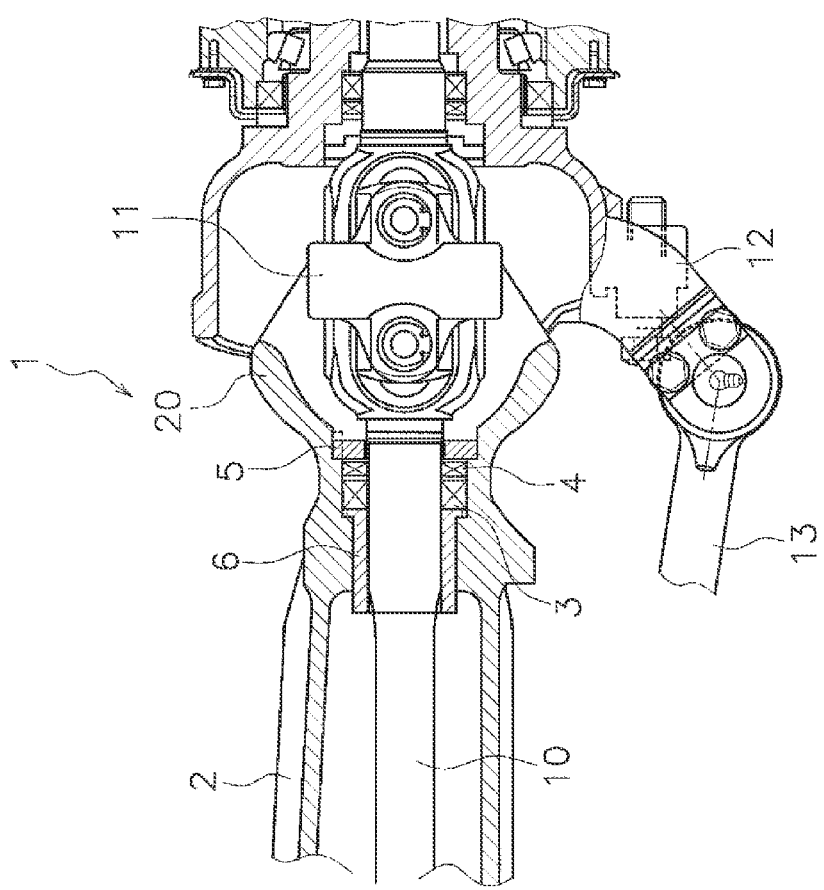
FIG. 1 is a partial cross-sectional structural view of an axle housing assembly according to an exemplary embodiment of the present invention.

FIG. 1 illustrates a part of an axle housing assembly according to an exemplary embodiment of the present invention. The axle housing assembly 1 is an assembly to be used for a backhoe loader and includes an axle housing 2, oil seals 3 as first seal members, dust seal 4 as second seal members, protective plates 5 and bushings 6. It should be noted that FIG. 1 only illustrates one side of the axle housing assembly and the other side thereof is also similarly structured.

Axle Housing

The axle housing 2 is extended in a transverse direction (a right-and-left direction of a vehicle) and is obtained in a form of a tubular casting. The axle housing 2 accommodates a differential gear mechanism (not illustrated in the figures) in the center part thereof, and axles 10 are extended right and left from the differential gear mechanism. A final reducer (only a shaft thereof is illustrated in FIG. 1) is coupled to the tip of each axle 10 through a joint 11. It should be noted that a rim forming a wheel is fixed to the outer periphery of each final reducer.

Figure 2:
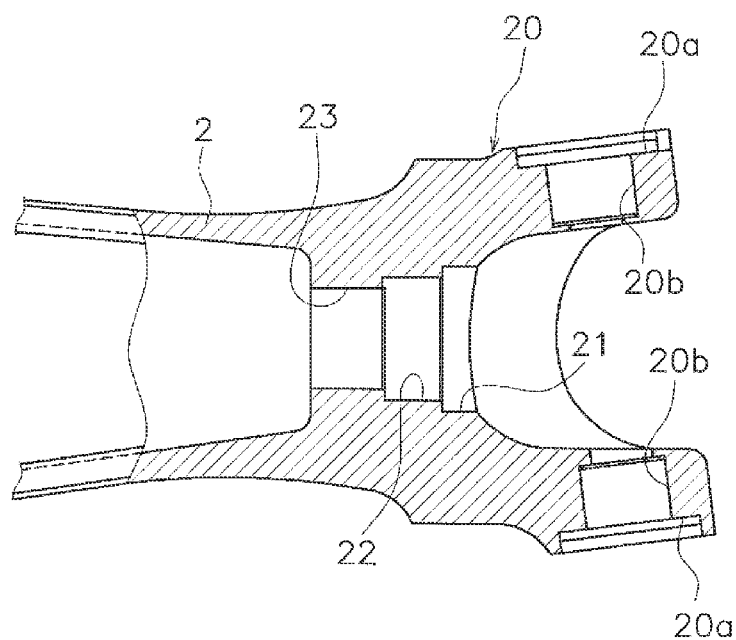
FIG. 2 is a partial cross-sectional view of the axle housing.

As illustrated in FIGS. 1 and 2, joint accommodating portions 20, opened outwards of the vehicle (wheel sides, hereinafter simply referred to as "outwards"), are formed on the both ends of the axle housing 2. It should be noted that FIG. 2 is a cross-sectional plan view of FIG. 1 and illustrates only the axle housing 2 extracted from FIG. 1. Each joint accommodating portion 20 has a shape gradually expanded outwards and accommodates the joint 11 therein. Further, as illustrated in FIG. 2, the joint accommodating portion 20 has two pairs of an attached portion 20a and a stepped through hole 20b, which are formed in opposed positions for attaching thereto a kingpin unit. Further, a knuckle 12 (see FIG. 1) is rotatably coupled to the joint accommodating portion 20 through the kingpin unit attached to the attached portion 20a. A tie rod 13 for steering (see FIG. 1) is rotatably coupled to an end of the knuckle 12 in the back-and-forth direction.

In the axle housing 2, a first recessed portion 21 and a second recessed portion 22 are formed on the vehicle inner side (a side on which the differential gear mechanism is disposed, hereinafter simply referred to as "inwards") of each joint accommodating portion 20, while being disposed from the outer side to the inner side in this order. Further, a through hole 23 is formed further inwards of the second recessed portion 22 for allowing the axle 10 to penetrate therethrough.

Figure 3:
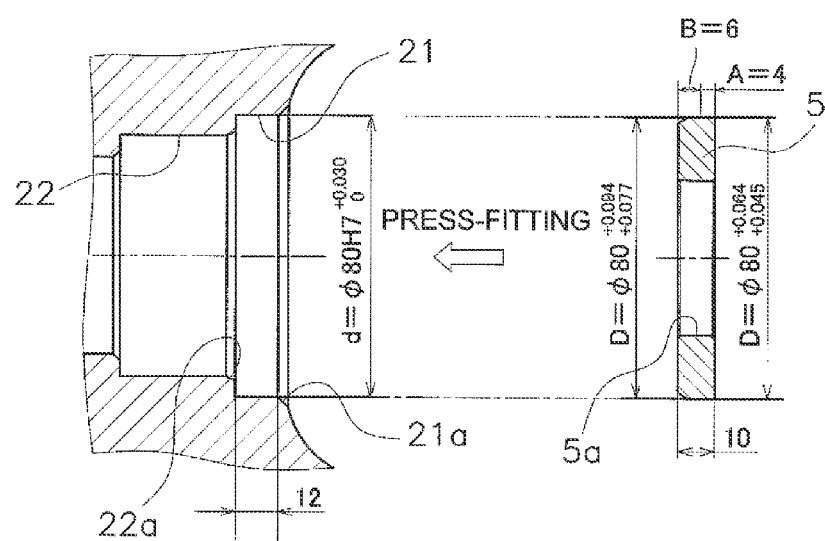
FIG. 3 is a diagram representing a relation between a protective plate and a second recessed portion.

The first recessed portion 21 has an inner diameter formed greater than that of the second recessed portion 22. Specifically, the inner diameter of the first recessed portion 21 is processed at a reference dimension d in a tolerance range of 0 to +n1. FIG. 3 illustrates the respective recessed portions 21 and 22 in a close-up manner. As is obvious from FIG. 3, a first chamfered portion 21a is formed on an outer edge of the first recessed portion 21, while a second chamfered portion 22a is formed on an outer edge of the second recessed portion 22.

Seal Member

The oil seal 3 and the dust seal 4 are both attached to each second recessed portion 22 of the axle housing 2. The inside of the axle housing 2 is filled with lubricating oil and each oil seal 3 is a seal member for preventing the lubricating oil from leaking to the outside of the axle housing 2. On the other hand, each dust seal 4 mainly blocks intrusion of external dust and prevents breakage or damage of a lip of the oil seal 3.

Protective Plate

As described above, the ends of the axle housing 2 are largely opened outwards. Therefore, foreign substances (earth, sand, dust, etc.) easily enter the axle housing 2 from the outside and reach the oil seals 3 through the dust seals 4 if such members as covers are not disposed outwards of the oil seals 3 and the dust seals 4.

In view of the above, a protective plate (disc-shaped member) 5 is attached to each first recessed portion 21 disposed outwards of the oil seal 3 and the dust seal 4. As illustrated in FIG. 3, the protective plate 5 has a disc shape with a through hole 5a formed in its center part for allowing the axle 10 to penetrate therethrough. The outer diameter of the protective plate 5 is formed so that a reference dimension D (equal to the inner diameter d of the first recessed portion) is constant over the entire thickness and a tolerance range is set differently between an inner region (a first region) and an outer region (a second region). The outer region is an outer region on the outer peripheral surface of the protective plate 5 (a wheel side region depicted as a region A in FIG. 3) and is processed in a tolerance range of +n2 (>n1) to +n3 (>n2). On the other hand, the inner region is an inner region on the outer peripheral surface of the protective plate 5 (a differential gear mechanism side region depicted as a region B in FIG. 3) and is processed in a tolerance range of +n4 (>n3) to +n5 (>n4).

As is obvious from the above, the protective plates 5 are press-fitted into the first recessed portions 21 by means of tight fit that an inner press fitting stock is greater than an outer press fitting stock.

Bushing

The bushings 6 are members for supporting the axles 10 in a rotatable state and are fitted into the through holes 23 of the axle housing 2. Each bushing 6 has a flanged portion on the outside part thereof and the flanged portion is disposed while being located within the second recessed portion 22.

Press-fitting of Protective Plates

Now, an action in press fitting of the protective plates will be explained by exemplifying specific dimensions. FIG. 3 represents exemplary dimensions of the first recessed portion 21 and the protective plate 5. The inner diameter d of the first recessed portion 21 has a reference dimension of 80 mm and a tolerance range of H7 (0 to +0.030 mm). Further, the depth of the first recessed portion 21 is 12 mm. On the other hand, the outer diameter D of the protective plate 5 has a reference dimension of 80 mm constantly set over the entire thickness, a tolerance range of +0.045 to +0.064 mm for the outer region A and a tolerance range of +0.077 to +0.094 mm for the inner region B. Further, the protective plate 5 has an entire thickness of 10 mm, while the region A has a thickness of 4 mm and the region B has a thickness of 6 mm.

Figure 4:
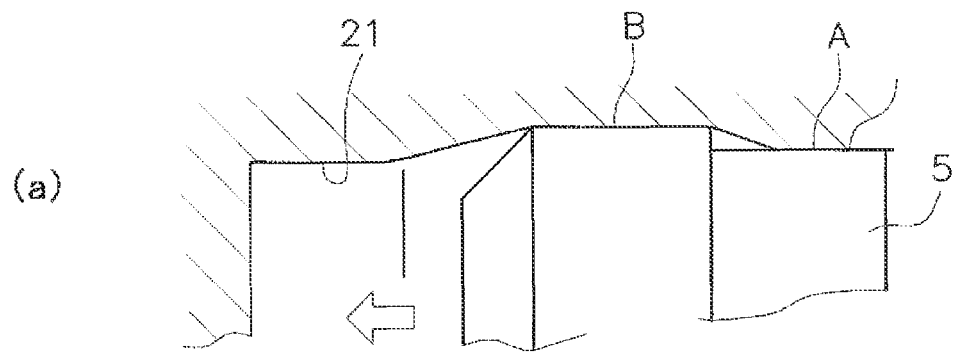
FIG. 4 is a diagram for explaining an action in press-fitting the protective plate.

When the protective plate 5 as described above is press-fitted into the first recessed portion 21, firstly as illustrated in FIG. 4(a), the first recessed portion 21 is elastically deformed while swelling outwards along the region B of the protective plate 5. The elastic deformation of the first recessed portion 21 advances to the rear side (inwards) in accordance with press fitting and finally reaches a state illustrated in FIG. 4(b). In other words, the inner region of the first recessed portion 21, corresponding to the region B of the protective plate 5, is formed in a shape expanded outwards from its original inner diameter.

On the other hand, regarding a part of the first recessed portion 21 that the region B of the protective plate 5 passed therethrough in accordance with advance of press fitting of the protective plate 5, a portion once outwardly expanded by elastic deformation is restored inwards along the region A of the protective plate 5 (see FIG. 4(b)).

As illustrated in FIG. 4(b), under a condition that the protective plate 5 is press-fitted into the bottom of the first recessed portion 21 as described above, the inner diameter of the outer part of the first recessed portion 21 becomes less than that of the inner part of the first recessed portion 21. Therefore, the protective plate 5 is prevented from easily outwardly coming off.

Here, in the outer opening of the first recessed portion 21, the inner diameter expanded by the protective plate 5 is less easily restored to its original inner diameter after passage of the protective plate 5, and additionally, is easily expanded by means of external force. Therefore, if tight fit of the protective plate 5 is executed while the region B is entirely formed on its outer periphery, the protective plate 5 more easily comes off in proportion to its proximity to the opening. In the present embodiment, however, the region A is formed outwards of the region B, and therefore, another tight fit region can be reliably formed outwards of the region B after press fitting of the protective plate 5. Accordingly, the protective plate 5 can be further prevented from easily coming off.

It should be noted that when the press fitting stock is increased, it is required to increase a load for pressing the protective plate in press fitting. Therefore, when the press fitting stock is increased, it is required to increase the thickness of the protective plate for preventing deformation of the protective plate in press fitting. Further, for preventing plastic deformation of the protective plate 5 in press fitting, a stress, which is determined by the outer diameter and the inner diameter of the axle housing 2 and those of the protective plate 5, is required to be set to be less than or equal to an yield point.

Features (1) With the protective plates 5, it is possible to prevent direct intrusion of foreign substances to the oil seals 3 and the dust seals 4 and achieve life time prolongation of the oil seals 3 and the dust seals 4.

(2) It is not required to provide snap rings and grooves for attaching thereto the snap rings in order to prevent the protective plates 5 from coming off. Therefore, the number of components can be reduced, while the axle housing 2 can be easily processed.

OTHER EXEMPLARY EMBODIMENTS

The present invention is not limited to the exemplary embodiment as described above, and a variety of changes or modifications can be herein made without departing from the scope of the present invention.

Figure 5:
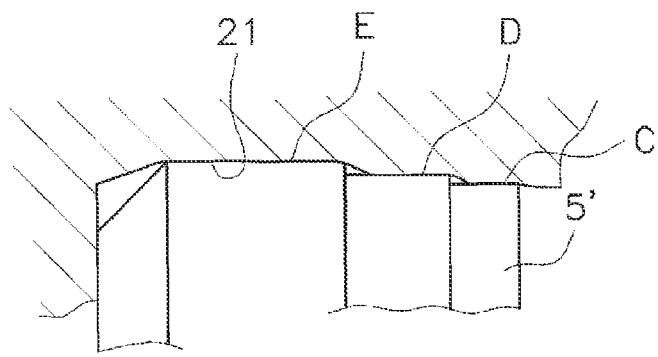
FIG. 5 is a diagram corresponding to FIG. 4 according to another exemplary embodiment of the present invention.

The processing dimension of the protective plate is exemplary only. Further, the outer peripheral surface of the protective plate is configured to be processed with two tolerance ranges. However, as illustrated in FIG. 5, for instance, a protective plate 5' may be processed with tolerance ranges whereby regions E, D and C are respectively formed on the outer peripheral surface thereof while being aligned outwards in the descending order of dimension.

According to the illustrated embodiments, it is possible to implement a simple structure in attaching a disc-shaped member to an axle housing and facilitate processing of the axle housing for preventing the disc-shaped member from coming off therefrom. Further, with a second region formed outwards of a first region, a tight fit region can be reliably produced outwards of the first region and the disc-shaped member can be reliably prevented from coming off.

The invention claimed is:

1. An axle housing assembly for a work vehicle adapted to be mounted in the work vehicle, the axle housing assembly comprising:
   an axle housing having a recessed portion for press fitting on an end thereof, the recessed portion being opened to a vehicle outer side, the recessed portion having a constant inner diameter; and
   a disc-shaped member press-fitted into the recessed portion, an outer peripheral surface of the disc-shaped member having a single reference dimension, a first region of the outer peripheral surface being arranged on an inner side in a press fitting direction and processed at a first tight fit tolerance range with respect to the reference dimension, a second region of the outer peripheral surface being arranged outwards of the first region and processed at a second tight fit tolerance range less than the first tight fit tolerance range.

2. The axle housing assembly for a work vehicle recited in claim 1, wherein the axle housing has an inner recessed portion formed on a vehicle inner side of the recessed portion, the inner recessed portion having an inner diameter less than the inner diameter of the recessed portion, the disc-shaped member has a through hole in a center part thereof, a seal member is attached to the inner recessed portion, and a rotary shaft is disposed while penetrating the through hole of the disc-shaped member and an inner peripheral part of the seal member.

3. The axle housing assembly for a work vehicle recited in claim 2, wherein the seal member includes an oil seal.

4. The axle housing assembly for a work vehicle recited in claim 2, wherein the seal member includes an oil seal and a dust seal.

5. The axle housing assembly for a work vehicle recited in claim 4, wherein the dust seal is arranged between the disc-shaped member and the oil seal.

6. The axle housing assembly for a work vehicle recited in claim 1, wherein the disc-shaped member has a third region arranged outwards of the second region, the third region being processed at a third tight fit tolerance range less than the second tight fit tolerance range.

7. The axle housing assembly recited in claim 1, wherein the axle housing has a joint accommodating part formed on an end thereof to accommodate therein a joint for coupling to a wheel-side member.

8. The axial housing assembly for a work vehicle recited in claim 1, wherein the recessed portion of the axle housing has the constant inner diameter before the disc-shaped member is press-fitted into the recessed portion, and the recessed portion is elastically deformed by the outer peripheral surface of the disc-shaped member so that the inner diameter of the recessed portion is smaller at an outer portion where the second region of the outer peripheral surface is arranged than at an inner portion where the first region of the outer peripheral surface is arranged after the disc-shaped member is press-fitted into the recessed portion.

* * * * *